Aug. 16, 1938. G. T. LAMPTON 2,127,264
PROPELLER BLADE
Filed Nov. 7, 1935
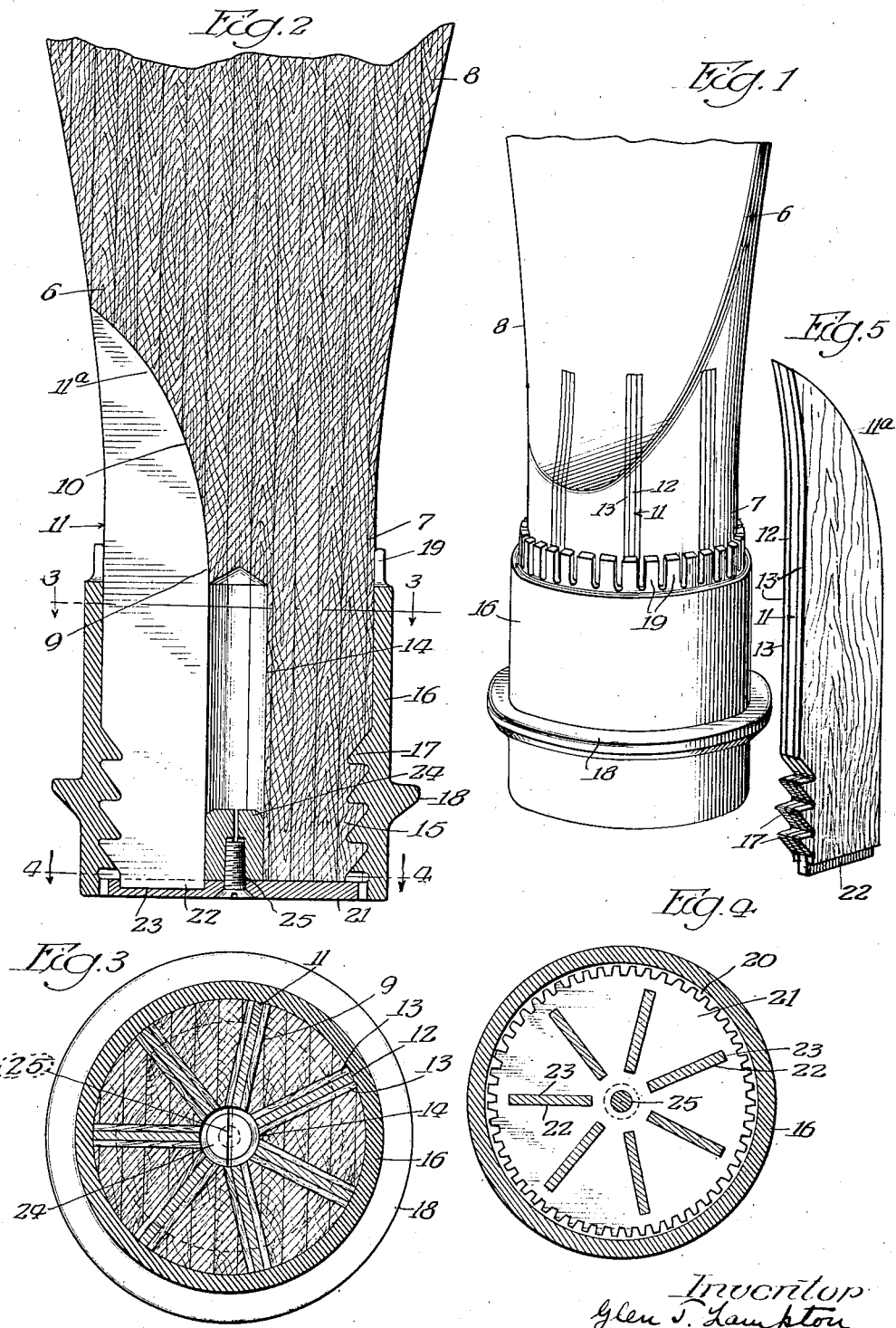

Patented Aug. 16, 1938

2,127,264

UNITED STATES PATENT OFFICE 2,127,264

PROPELLER BLADE

Glen T. Lampton, Williamsport, Pa., assignor to Aviation Manufacturing Corporation, Chicago, Ill., a corporation of Delaware Application November 7, 1935, Serial No. 48,643

13 Claims. (Cl. 170—159)

The invention relates to propeller blades for aircraft.

Propeller blades of laminated wood have important advantages over metal blades in that they can be produced at a low cost without elaborate tools and because they can be easily modified to meet the requirements of different air plane engine combinations with a high degree of precision and to avoid undesired vibration characteristics.

In mounting blades in the hub of a controllable pitch or of a variable fixed pitch propeller, it is necessary to mount them in the hub for rotation on their axes for pitch-changes. For this purpose, threads or grooves have been formed in the cylindrical wooden shank of the blades to provide a connection between said cylindrical portion and a metal ferrule which is adapted for rotation in the hub. When threads or annular grooves are turned in the cylindrical wooden shank, they are extremely weak, because the wood is placed in shear parallel to the grain. Similar weaknesses have resulted from attachment by means of bolts, conical wedges, and other devices. These methods of attachment have not been satisfactory, due to the difference in elastic behaviour of the wood and the ferrules which allowed the attachment to become loose and thereafter rapidly fail under torque impulses and vibrations.

The object of the present invention is to provide a wooden or similar propeller blade in which these objections are overcome and in which the blade of wood is greatly reinforced by metallic strips or plates inserted in the shank and efficiently bonded to the wood so that in use the ferrule and shank of the blade will remain permanently and securely connected.

Another object of the invention is to provide such a blade in which the insert plates or strips are bonded to the shank and interfit with the ferrule so they will receive shear stresses when the blade is in operation.

A further object of the invention is to provide a wooden propeller blade having its shank reinforced with metallic inserts which will distribute the shear stresses which result from centrifugal force over a very large area of the joints in the wooden shank.

A still further object of the invention is to provide an improved wooden propeller blade.

Other objects of the invention will appear from the detailed description.

The invention consists in the several novel features which are hereinafter set forth and are more particularly defined by claims at the conclusion hereof.

In the drawing:

Fig. 1 is a perspective of the shank portion of the blade embodying the invention; Fig. 2 is a longitudinal section; Fig. 3 is a section on line 3—3 of Fig. 1; Fig. 4 is a section on line 4—4 of Fig. 1; Fig. 5 is a detail perspective of one of the metallic inserts.

The invention is exemplified in a blade comprising a cylindrical shank 7 and body 8 formed of laminations 6 of wood. The body may have thrust and suction faces of any desirable shape, as well understood in the art. These laminations are glued or otherwise suitably secured together in the usual manner, the grain extending generally longitudinally of the blade.

In the manufacture of the blade embodying the invention, a series of radial slits or kerfs 9 are sawed into the shank by a circular saw, so as to extend longitudinally from the inner end of the shank to terminate in a curve, as at 10, and beyond the ferrule in which the shank is secured. These slits are cut into the laminated blade to receive a corresponding series of radially extending inserts 11. These inserts fit in and conform to the inner and outer edges of the slits 9. Each consists of a metal plate or strip 12, preferably of steel, to the side-faces of which have been bonded, under high pressure, at a raised temperature, facings of wood veneer or plywood 13. Any suitable cement or glue, such as now used in bonding wood veneer to metal may be used. The veneer or plywood facings 13 on the metal plates 12 provide a suitable surface, which may be firmly bonded, by a suitable glue, to the contiguous radial side-faces of the slits in the laminations 6. The inserts 11 are bonded to the laminations by suitable glue, and radial pressure is applied to the laminated segments between the inserts, so that very strong joints are obtained between the veneer on the inserts and the wood in the shank blade. The veneer faces of the inserts provide large areas for bonding the inserts to the laminations of the blade. The slits 9 and inserts terminate at a central bore 14 drilled into the laminated portion of the shank. The curved edges 11ª of the inserts conform to the arc of the saw used to cut the slits in the shank. When the inserts have been thus secured in the wooden blade, they are united therewith so as to constitute metallic reinforcement. The outer edges of the inserts are flush with the outside of the blade.

After the inserts have been fixed in the shank, a buttress screw-thread or groove 15 is machined into the periphery of the shank so it extends into the inserts and the laminations between the inserts. A metallic ferrule 16 for mounting the blade in a hub is provided with a corresponding buttress screw-thread so the ferrule can be screwed onto the shank and will interfit with the groove 15 which extends across the inserts and the intermediate laminated sections. The ferrule 16 is provided with an integral annular shoulder 18 which is adapted to rotatably seat in the hub of a controllable or variable fixed pitch propeller. In a controllable pitch propeller this shoulder will serve as a centrifugal thrust element. In a fixed pitch propeller the ferrule may be clamped in a split hub, as well understood in the art. The ferrule has a slotted extension 19, which is usually disposed outside of the propeller-hub, to resiliently support the blade adjacent the point where it enters and is fixed in the heavy wall of the ferrule 16. The metallic inserts 11 extend outwardly beyond the ferrule and the hub to reinforce the blade outwardly beyond the ferrule and to increase the area of the joints between the inserts and the shank to distribute, over a very large surface, the glued joints, and also to reinforce the portion of the blade beyond the ferrule. The metallic inserts, when bonded to the shank, transmit shear stresses, which result from centrifugal force, to the metallic ferrule. When threads or grooves for an interfit between the blade and the ferrule, are turned into the shank made of wood, they are extremely weak because the wood is placed in shear parallel to the grain. Consequently, the radially disposed longitudinally extending metallic inserts provide a very efficient reinforcement for the wooden blade. Furthermore, the metallic inserts prevent crushing of the wood across the grain under clamping force and prevent the shank from being forced out of round when it is forced into the ferrule or the ferrule is subjected to clamping pressure in the hub.

To lock the shank of the blade and ferrule against relative rotation, an annular series of internal gear teeth 20 are formed in the inner end of the ferrule and an end-plate 21 provided with teeth adapted to mesh with the gear teeth 20, is secured on the inner end of the shank. Preferably, the metal strips 12 of the inserts are extended longitudinally beyond the end of the shank, as at 22, to fit into corresponding recesses 23 in the locking plate 21. A split-plug 24 fitting in the bore 14 is adapted to be jammed in the bore to lock the plate 23 to the shank by means of a tapered screw 25.

The invention exemplifies a wooden propeller blade with radially disposed longitudinally extending metal inserts which are bonded to the shank and serve to take shear stresses resulting from centrifugal force through the interfit between the ferrule and the inserts and therefore advantageously disposes the load from the bearing pressure standpoint. These forces are transmitted to the inserts and distributed over extensive areas of glued joints between the inserts and the laminated sections of the blade. The inserts are extended beyond the ferrule to reinforce the body of the blade adjacent the shank. By reason of the reinforcement provided by the inserts and the transmission of shear stresses through the plates to the ferrule, the blade will possess the desired strength for service at high speed.

While the invention has been described in connection with a propeller of laminated wood, it will be understood that it may be applied to blades formed of similar materials such as compositions.

The invention is not to be understood as restricted to the details set forth, since these may be modified within the scope of the appended claims, without departing from the spirit and scope of the invention.

Having thus described the invention, what I claim as new and desire to secure by Letters Patent is:

1. A propeller blade comprising a body and a cylindrical shank of laminated material such as wood with longitudinal metallic plates in the shank and bonded thereto and intersecting the joints between the laminae.

2. A propeller blade comprising a body and a cylindrical shank of laminated wood having radially disposed longitudinal slits intersecting the laminae cut therein and metallic plates fitting in the slits and having their side faces bonded to the contiguous faces of the slits.

3. A propeller blade comprising a body and a cylindrical shank of material such as wood having radially disposed longitudinal slits therein, metallic plates fitting in and bonded to the sides of the slits, the inner edges of the outer ends of the plates and slits being curved conformably to and terminating at the periphery of the blade.

4. A propeller blade comprising a body and a cylindrical shank of laminated material such as wood and metallic plates faced with and bonded to veneer and inserted into, and having the veneer faces bonded to, the shank.

5. A propeller blade comprising a body and a cylindrical shank of laminated material such as wood and radially disposed longitudinal metallic plates faced with and bonded to veneer and inserted into, and having the veneer faces bonded to, the shank.

6. A propeller blade comprising a body and a cylindrical shank of laminated material such as wood having slits therein and inserts composed of metallic plates faced with and bonded to veneer, the veneer faces on the plates being bonded to the material forming the faces of the slits.

7. A propeller blade comprising a body and a shank of material such as wood, a metallic ferrule around the shank and radially disposed metallic plates inserted in and bonded to the shank, the plates and shank and the ferrule having interfitting portions for transmission of shear stresses through the plates to the ferrule.

8. A propeller blade comprising a body and a shank of laminated material such as wood, having longitudinal slits therein, a metallic ferrule around the shank, and metallic plates inserted in the slits and bonded to the shank, the plates and the ferrule having interfitting portions for transmission of shear stresses through the plates to the ferrule, the side-faces of the plates being bonded to the contiguous faces of the slits.

9. A propeller blade comprising a body and a shank of material such as wood, a metallic ferrule around the shank and radially disposed metallic plates in and bonded to the shank, the plates extending outwardly beyond the ferrule.

10. A propeller blade comprising a body and a cylindrical shank of material such as wood, the shank having a central bore and radially disposed metallic plates inserted in and bonded to the shank and extending from its periphery to the bore.

11. A propeller blade comprising a body and a shank of material such as wood, a central bore in the shank, longitudinal metallic plates in the shank and extending from its periphery to the bore, a ferrule around the shank, and means for locking the shank to the ferrule against relative rotation, comprising an end-plate interlocked with the ferrule and means for securing the plate against rotation in the shank.

12. A propeller blade comprising a body and a shank of material such as wood, a central bore in the shank, longitudinal metallic insert plates in the shank, a ferrule around the shank, and means for locking the shank to the ferrule against relative rotation, comprising an end-plate interlocked with the ferrule, and means for securing the end-plate against rotation in the shank, the insert plate being extended to interfit with the locking-plate.

13. A propeller blade comprising a cylindrical shank of material such as wood and a series of flat metallic plates in and extending longitudinally of the shank and extending radially inward from its periphery and terminating adjacent its axis, the plates being bonded to said material.

GLEN T. LAMPTON.